(12) United States Patent
Kiya

(10) Patent No.: US 9,465,253 B2
(45) Date of Patent: Oct. 11, 2016

(54) LIQUID CRYSTAL DISPLAY APPARATUS HAVING EXCELLENT VIEWING ANGLE COMPENSATION

(75) Inventor: Yoshiyuki Kiya, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 352 days.

(21) Appl. No.: 12/092,486

(22) PCT Filed: Jun. 19, 2006

(86) PCT No.: PCT/JP2006/312229
§ 371 (c)(1),
(2), (4) Date: May 2, 2008

(87) PCT Pub. No.: WO2007/057998
PCT Pub. Date: May 24, 2007

(65) Prior Publication Data
US 2009/0153784 A1    Jun. 18, 2009

(30) Foreign Application Priority Data
Nov. 15, 2005  (JP) .................................. 2005-329887

(51) Int. Cl.
*G02F 1/1335* (2006.01)
*G02F 1/1333* (2006.01)
*G02F 1/13363* (2006.01)

(52) U.S. Cl.
CPC ..................... *G02F 1/13363* (2013.01); *G02F 2001/133567* (2013.01); *G02F 2413/01* (2013.01); *G02F 2413/12* (2013.01)

(58) Field of Classification Search
CPC ..................... G02F 1/13363; G02F 1/133634; G02F 1/133514; G02F 1/133512; G02F 1/133516; G02F 1/1333; G02F 1/133305; G02F 1/133351; G02B 5/3083
USPC ................................. 349/117, 118, 106, 158
See application file for complete search history.

(56) References Cited

U.S. PATENT DOCUMENTS 6,512,569 B1 *  1/2003  Acosta et al. ................. 349/181
6,731,359 B1 *  5/2004  Fukaya ........................ 349/112
(Continued)

FOREIGN PATENT DOCUMENTS

JP          11-95208 A      4/1999
JP          11-326887 A     11/1999
(Continued)

OTHER PUBLICATIONS

International Search Report of PCT/JP2006/312229, date of mailing Sep. 19, 2006.
(Continued)

*Primary Examiner* — Mike Qi
(74) *Attorney, Agent, or Firm* — Westerman, Hattori, Daniels & Adrian, LLP

(57) ABSTRACT

A liquid crystal display apparatus of the present invention includes: a liquid crystal cell including a pair of substrates provided with a color filter on one substrate, and a liquid crystal layer as a display medium arranged between the substrates; and an optical compensation element including at least an optical compensation layer. The substrate provided with the color filter has a haze value of more than 10%, and the optical compensation element and the liquid crystal layer are arranged on the same side with respect to the color filter.

5 Claims, 11 Drawing Sheets

(56) References Cited

U.S. PATENT DOCUMENTS

| | | | |
|---|---|---|---|
| 7,006,173 B1* | 2/2006 | Hiyama et al. | 349/96 |
| 7,099,082 B2* | 8/2006 | Kawanishi et al. | 359/489.05 |
| 7,245,336 B2 | 7/2007 | Hiyama et al. | |
| 7,253,860 B2 | 8/2007 | Chang | |
| 7,410,679 B2* | 8/2008 | Matsufuji | 428/1.3 |
| 7,462,306 B2* | 12/2008 | Fukagawa | 264/1.34 |
| 8,184,244 B2* | 5/2012 | Ueda et al. | 349/117 |
| 2003/0169391 A1* | 9/2003 | Uchida et al. | 349/130 |
| 2004/0169800 A1* | 9/2004 | Yoshii et al. | 349/113 |
| 2004/0212767 A1* | 10/2004 | Sasaki et al. | 349/118 |
| 2004/0223104 A1 | 11/2004 | Chang | |
| 2005/0030456 A1* | 2/2005 | Murakami et al. | 349/117 |
| 2005/0057704 A1* | 3/2005 | Ootake et al. | 349/69 |
| 2005/0083456 A1* | 4/2005 | Yoshii | 349/113 |
| 2005/0129877 A1* | 6/2005 | Akada et al. | 428/1.6 |
| 2005/0264735 A1* | 12/2005 | Tago et al. | 349/119 |
| 2006/0098147 A1* | 5/2006 | Murakami | 349/119 |
| 2006/0125978 A1 | 6/2006 | Hiyama et al. | |

FOREIGN PATENT DOCUMENTS

| | | | | |
|---|---|---|---|---|
| JP | 2002-250803 A | | 9/2002 | |
| JP | 2003-66452 A | | 3/2003 | |
| JP | 2003-156743 A | | 5/2003 | |
| JP | 2003156743 A | * | 5/2003 | G02F 1/13363 |
| JP | 2003-344856 A | | 12/2003 | |
| JP | 2003344856 A | * | 12/2003 | G02F 1/13363 |
| JP | 2004-037706 A | | 2/2004 | |
| JP | 2004-038064 A | | 2/2004 | |
| JP | 2004-334198 A | | 11/2004 | |
| JP | 2005-154764 A | | 6/2005 | |

OTHER PUBLICATIONS

Office Action issued Nov. 25, 2009 in corresponding Korean Patent Application No. 10-2008-7010179.

* cited by examiner

LIQUID CRYSTAL DISPLAY APPARATUS HAVING EXCELLENT VIEWING ANGLE COMPENSATION

TECHNICAL FIELD

The present invention relates to a liquid crystal display apparatus. The present invention more specifically relates to a liquid crystal display apparatus which allows excellent viewing angle compensation, which exhibits exceptional contrast in an oblique direction, and which can be reduced in thickness.

BACKGROUND ART

FIG. 11(a) shows a schematic sectional view of a conventional liquid crystal display apparatus, and FIG. 11(b) shows a schematic sectional view of a liquid crystal cell used for the liquid crystal display apparatus. A liquid crystal display apparatus 900 is provided with: a liquid crystal cell 910; retardation plates 920 and 920' arranged on outer sides of the liquid crystal cell 910; and polarizing plates 930 and 930' arranged on outer sides of the retardation plates 920 and 920', respectively. The polarizing plates 930 and 930' are generally arranged such that respective absorption axes thereof are perpendicular to each other. The liquid crystal cell 910 includes: a pair of substrates 911 and 911'; and a liquid crystal layer 912 as a display medium arranged between the substrates. One substrate 911 is provided with: a switching element (typically, TFT) for controlling electrooptic characteristics of liquid crystal; and a scanning line for providing a gate signal to the switching element and a signal line for providing a source signal thereto (the element and the lines not shown) The other substrate 911' is provided with: color layers 913R, 913G, and 913B constituting a color filter; and a light shielding layer (black matrix layer) 914. A space (cell gap) between the substrates 911 and 911' is controlled by a spacer (not shown).

The retardation plates are used for the purpose of optical compensation of the liquid crystal display apparatus. Various attempts have been made at optimization of optical characteristics of the retardation plates and/or at arrangement of the retardation plates in the liquid crystal display apparatus for attaining optimum optical compensation (such as improvement in viewing angle characteristics, improvement in color shift, and improvement in contrast). Conventionally, as shown in FIGS. 11(a) and 11(b), one retardation plate is arranged between the liquid crystal cell 910 and the polarizing plate 930, and another retardation plate is arranged between the liquid crystal cell 910 and the polarizing plate 930' (see Patent Document 1, for example). In order to attain optimum optical compensation with such a structure, the retardation plates disclosed in JP 11-095208 A and arranged on both sides of the liquid crystal cell each have a thickness of 140 μm. However, when conventional retardation plates are used in a liquid crystal display apparatus in a conventional arrangement, contrast in an oblique direction often degrades. Meanwhile, further improvement in screen uniformity and display quality is demanded with recent development of a high-definition and high-performance liquid crystal display apparatus. In consideration of such a demand, degradation of contrast in an oblique direction is a critical issue. Further, a demand for reduction in thickness of the liquid crystal display apparatus has increased with the development of a small, portable liquid crystal display apparatus. However, a liquid crystal display apparatus is hardly reduced in thickness if two thick retardation plates are arranged as in the conventional liquid crystal display apparatus.

As described above, a liquid crystal display apparatus capable of satisfying the demands for excellent display quality and reduction in thickness has been desired strongly.

Patent Document 1: JP Hei 11(1999)-95208 A

DISCLOSURE OF THE INVENTION

Problems to be Solved by the Invention

The present invention has been made in view of solving the above conventional problems, and an object of the present invention is therefore to provide a liquid crystal display apparatus which allows excellent viewing angle compensation, which exhibits exceptional contrast in an oblique direction, and which can be reduced in thickness.

Means for Solving the Problems

A liquid crystal display apparatus according to an embodiment of the present invention includes: a liquid crystal cell including a pair of substrates provided with a color filter on one substrate, and a liquid crystal layer as a display medium arranged between the substrates; and an optical compensation element including at least an optical compensation layer. The substrate provided with the color filter has a haze value of more than 10%, and the optical compensation element and the liquid crystal layer are arranged on the same side with respect to the color filter.

In one embodiment of the invention, the color filter is arranged on a viewer side and the optical compensation element is arranged on a backlight side. In another embodiment of the invention, the liquid crystal cell employs a VA mode or an OCB mode.

In still another embodiment of the invention, the optical compensation layer is formed from a non-liquid crystalline material. In still another embodiment of the invention, the non-liquid crystalline material includes at least one polymer selected from the group consisting of polyimide, polyamide, polyester, polyetherketone, polyamideimide, and polyesterimide.

In still another embodiment of the invention, the optical compensation layer has a refractive index profile of nx>ny>nz. In still another embodiment of the invention, the optical compensation layer has a thickness of 1 to 20 μm.

Effects of the Invention

As described above, the present invention can provide a liquid crystal display apparatus allowing exceptional viewing angle compensation and exhibiting exceptional contrast in an oblique direction by arranging a specific optical compensation element and a liquid crystal layer on the same side with respect to a color filter and by employing a specific haze value for the substrate provided with the color filter. Such an effect is particularly remarkable when a haze value of a substrate provided with a color filter is more than 10%. On the other hand, when a haze value of the substrate provided with a color filter is small (typically, 10% or less), the optical element may be arranged on the same side as the color filter with respect to the liquid crystal layer, to thereby obtain a liquid crystal display apparatus allowing excellent viewing angle compensation and exhibiting exceptional contrast in an oblique direction. Such an effect is not theoretically clarified, is a finding obtained for the first time through actual production of the liquid crystal display apparatus, and is an unexpected and excellent effect. It is conceivable that such an excellent effect is obtained because a large haze value of the substrate provided with a color filter presumably causes moderate light scattering when light of backlight (that is, polarized light), which has passed through a polarizing plate and has been appropriately compensated through a specific optical compensation element, passes through the color filter. As a result, degradation of contrast not only in a front direction but also in an oblique direction is presumably suppressed, and coloring of display is presumably prevented. Further, the optical compensation layer of the optical compensation element used in the present invention has a considerably small thickness compared to that of a conventional retardation plate. Moreover, unlike a conventional liquid crystal display apparatus employing two retardation plates, the present invention uses only one such optical element to realize exceptional viewing angle compensation. Thus, the present invention may greatly contribute to reduction in thickness of the liquid crystal display apparatus.

DESCRIPTION OF REFERENCE NUMERALS

Figure 1:
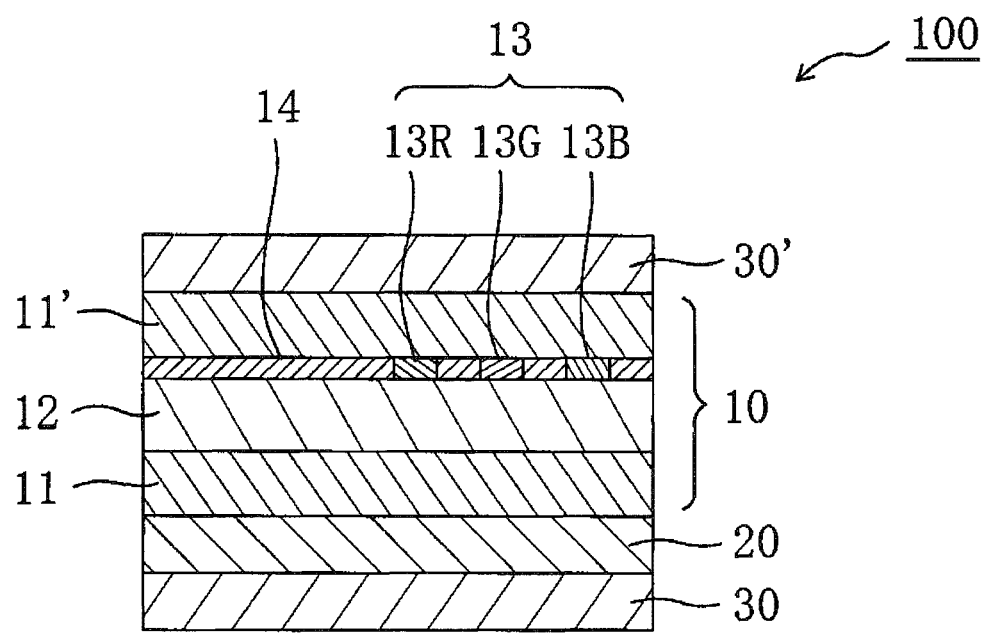
FIG. 1 Schematic sectional view of a liquid crystal display apparatus according to a preferred embodiment of the present invention.

10 Liquid crystal cell
20 Optical compensation element
30, 30' Polarizing plate
11, 11' Glass substrate
12 Liquid crystal layer
13 Color filter
100 Liquid crystal display apparatus

BEST MODE FOR CARRYING OUT THE INVENTION

A. Liquid Crystal Display Apparatus

Figure 2:
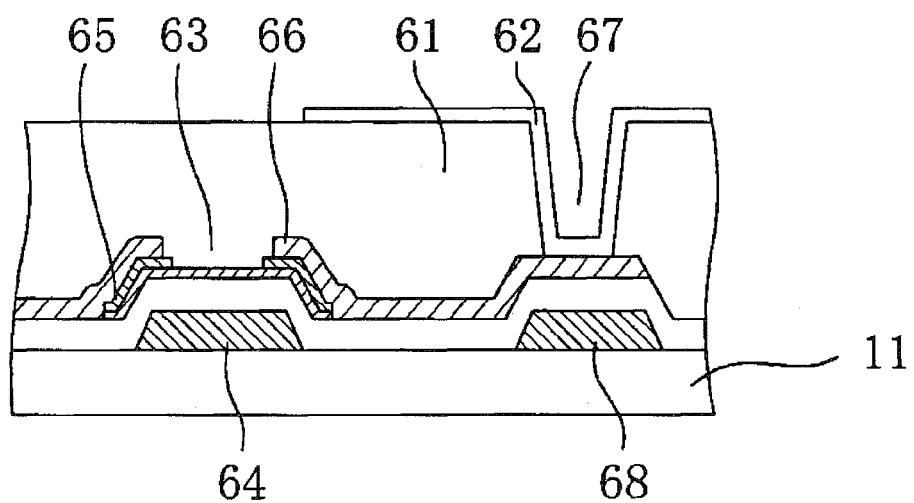
FIG. 2 Schematic sectional view of an active matrix substrate used for the liquid crystal display apparatus of FIG. 1 taken along the line II-II of FIG. 3.
Figure 3:
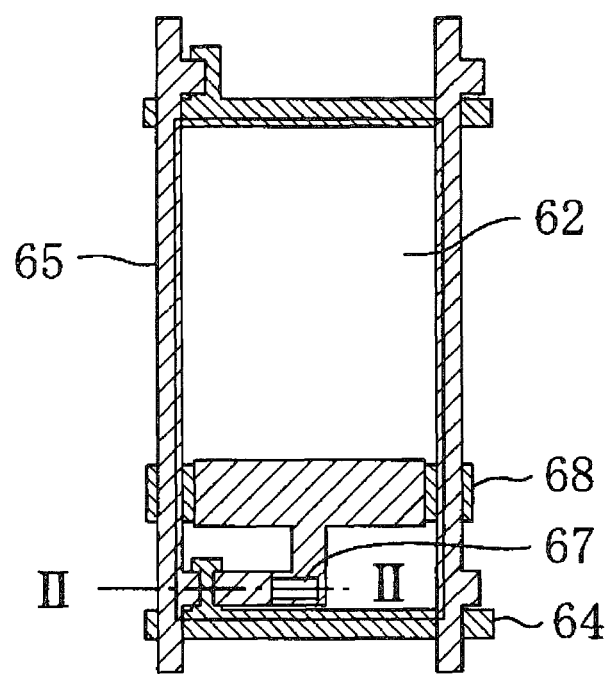
FIG. 3 Schematic plan view of the active matrix substrate of FIG. 2.

FIG. 1 is a schematic sectional view of a liquid crystal display apparatus according to a preferred embodiment of the present invention. FIG. 2 is a schematic sectional view of an active matrix substrate used for the liquid crystal display apparatus taken along the line II-II of FIG. 3. FIG. 3 is a schematic plan view of the active matrix substrate of FIG. 2.

A liquid crystal display apparatus 100 is provided with: a liquid crystal cell 10; an optical compensation element 20 provided on an outer side of the liquid crystal cell 10; a polarizing plate 30 provided on an outer side of the optical compensation element 20; and a polarizing plate 30' provided on a side of the liquid crystal cell 10 on which the optical compensation element 20 is not provided. The polarizing plates 30 and 30' each include a polarizer, and a transparent protective layer as required. The polarizing plates 30 and 30' are generally arranged such that absorption axes of the respective polarizers are perpendicular to each other. The liquid crystal cell 10 includes: a pair of glass substrates 11 and 11'; and a liquid crystal layer 12 as a display medium arranged between the substrates. One substrate (active matrix substrate) 11 is provided with: a switching element (typically, TFT) for controlling electrooptic characteristics of liquid crystal; and a scanning line for providing a gate signal to the switching element and a signal line for providing a source signal thereto (the element and the lines not shown). The other glass substrate (color filter substrate) 11' is provided with a color filter 13. The color filter 13 may be provided on the active matrix substrate 11. Preferably, the color filter 13 is provided on a viewer side (in the illustrated example, on the substrate 11'). A space (cell gap) between the substrates 11 and 11' is controlled by a spacer (not shown). An alignment film (not shown) formed of, for example, polyimide is provided on a side of each of the substrates 11 and 11' in contact with the liquid crystal layer 12.

In the liquid crystal display apparatus of the present invention, the optical compensation element 20 is arranged on the opposite side against the color filter 13 with respect to the liquid crystal layer 12 (in the illustrated example, on a backlight side) That is, with respect the color filter 13, the optical compensation element 20 and the liquid crystal layer 12 are arranged on the same side. More specifically, the optical compensation element 20 is arranged on an outer side (backlight side in the figure) of the substrate (substrate 11 in the figure) on which the color filter 13 is not provided. A specific optical compensation element 20 is arranged on one side of the liquid crystal cell in a specific positional relationship with the color filter, to thereby obtain a liquid crystal display apparatus allowing exceptional viewing angle compensation and exhibiting exceptional contrast in an oblique direction. Such an effect is not theoretically clarified, is a finding obtained for the first time through actual production of a liquid crystal display apparatus, and is an unexpected and excellent effect.

The substrate provided with the color filter has a haze value of more than 10%, preferably 12% or more, more preferably 14% or more, and most preferably 15% or more. The upper limit of the haze value is preferably 25%, and more preferably 20%. The above effect is significant with use of such a substrate provided with the color filter having a high haze value. In the present specification, the haze value of a substrate provided with a color filter refers to a haze value of a substrate including a light shielding layer (black matrix layer).

The active matrix substrate 11 is provided with an interlayer insulating film 61 over an entire surface on a side of the liquid crystal layer 12. The interlayer insulating film 61 is formed through spin coating of a photosensitive acrylic resin, for example. As shown in FIG. 2, a pixel electrode 62 is provided on the interlayer insulating film 61 in a matrix form, and a region provided with the pixel electrode 62 serves as a display portion for displaying an image. The pixel electrode 62 is composed of a transparent conductive material such as indium tin oxide (ITO). The pixel electrode 62 may be formed by: forming a thin film through, for example, sputtering; and patterning the thin film through photolithography and etching. Any suitable TFTs 63 provided in a matrix form, a scanning line 64 for supplying a gate signal to the TFT 63, and a signal line 65 for supplying a source signal (display signal) thereto are provided under the interlayer insulating film 61. The scanning line 64 and the signal line 65 are provided to be perpendicular to each other. The TFT 63 generally includes: a semiconductor layer of amorphous silicon, polysilicon, or the like; and a metal layer of aluminum, molybdenum, chromium, copper, tantalum, or the like. The scanning line 64 and the signal line 65 are each formed of aluminum, molybdenum, copper, or the like. A part of the scanning line 64 constitutes a gate electrode of the TFT 63, and a part of the signal line 65 constitutes a source electrode. One end of a connecting piece is electrically connected to a drain electrode 66 of the TFT 63. The other end of the connecting piece is electrically connected to the pixel electrode 62 via a contact hole 67 penetrating through the interlayer insulating film 61. A parasitic capacity wiring 68 extends below the contact hole 67. Such a structure allows selective application of a voltage to the desired pixel electrode 62.

The color filter substrate 11' is provided with the color filter 13 including color layers 13R, 13G, and 13B for red (R), green (G), and blue (B) divided by a light shielding layer (black matrix layer) 14. The color layers 13R, 13G, and 13B are each formed using an acrylic resin, gelatin, or the like, and are provided at positions corresponding to the pixel electrode 62 in the display portion. The black matrix layer 14 may be formed of a metal, or may be formed of a resin material. A resin material is generally prepared by dispersing a pigment in an acrylic resin.

A drive mode of the liquid crystal cell 10 may employ any suitable drive modes as long as the effects of the present invention can be provided. Specific examples of the drive mode include a super twisted nematic (STN) mode, a twisted nematic (TN) mode, an in-plane switching (IPS) mode, a vertical aligned (VA) mode, an optically aligned birefringence (OCB) mode, a hybrid aligned nematic (HAN) mode, and an axially symmetric aligned microcell (ASM) mode. Of those, a VA mode and an OCB mode are preferred because viewing angle compensation and contrast in an oblique direction are significantly improved by combining a VA mode or OCB mode liquid crystal cell with the optical compensation element 20 of the present invention.

Figure 4A:
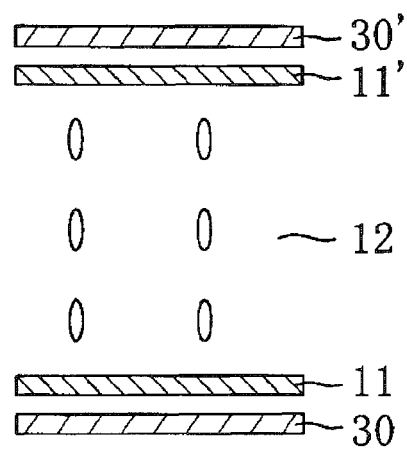
FIGS. 4(a) and 4(b) Schematic sectional views respectively illustrating an alignment state of liquid crystal molecules of a liquid crystal layer in a case where a liquid crystal display apparatus of the present invention employs a VA mode liquid crystal cell.
Figure 4B:
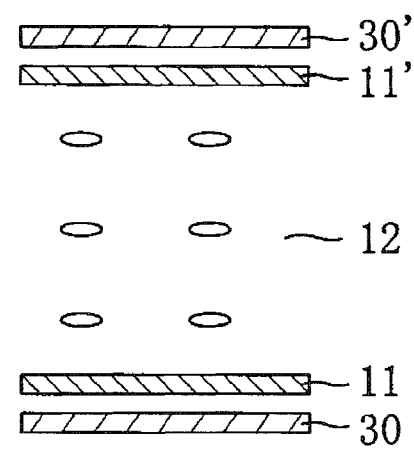

FIGS. 4(a) and 4(b) are each a schematic sectional view illustrating an alignment state of liquid crystal molecules in a VA mode. As shown in FIG. 4(a), liquid crystal molecules are aligned vertically to the substrates 11 and 11' without application of a voltage. Such vertical alignment is realized by arranging nematic liquid crystal having negative dielectric anisotropy between the substrates each having a vertical alignment film formed thereon (not shown). When light (specifically, linear polarized light which passed through the polarizing plate 30) enters the liquid crystal layer 12 in such a state from a surface of one substrate 11, the incident light advances along a longitudinal direction of the vertically aligned liquid crystal molecules. No birefringence occurs in the longitudinal direction of the liquid crystal molecules, and thus the incident light advances without changing a polarization direction and is absorbed by the polarizing plate 30' having an adsorption axis perpendicular to the polarizing plate 30. In this way, a dark state is displayed without application of a voltage (normally black mode). As shown in FIG. 4(b), longitudinal axes of the liquid crystal molecules align parallel to the substrate surfaces when a voltage is applied between the electrodes. The liquid crystal molecules exhibit birefringence with linear polarized light entering the liquid crystal layer 12 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the polarizing plate 30', and a bright state is displayed. Upon termination of voltage application, the display is returned to a dark state by an alignment restraining force. An applied voltage is changed to control inclination of the liquid crystal molecules, so as to change an intensity of light transmission from the polarizing plate 30'. As a result, display of gradation can be realized.

Figure 5A:
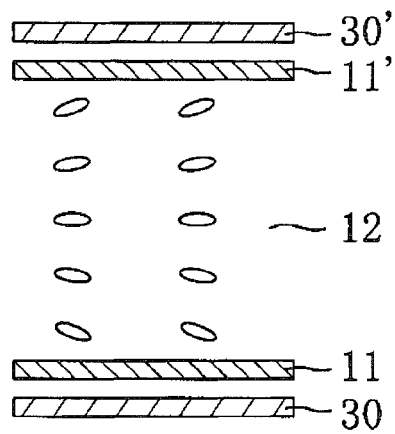
FIGS. 5(a) to 5(d) Schematic sectional views respectively illustrating an alignment state of liquid crystal molecules of a liquid crystal layer in a case where a liquid crystal display apparatus of the present invention employs an OCB mode liquid crystal cell.
Figure 5B:
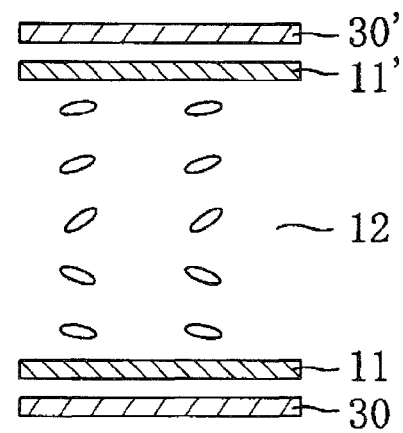
Figure 5C:
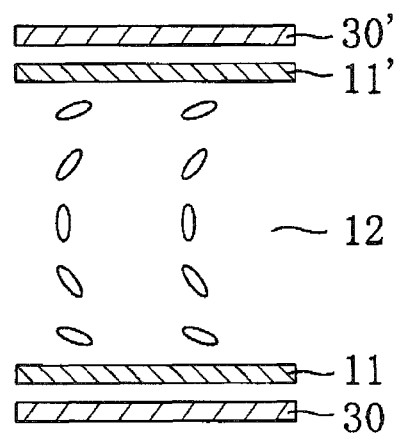
Figure 5D:
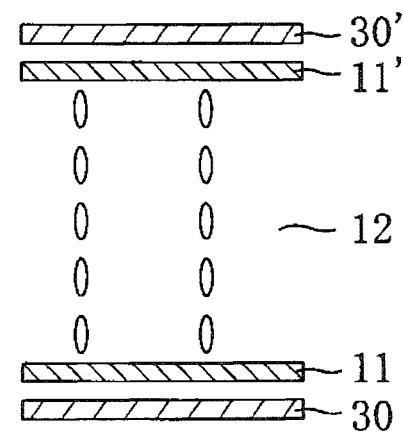

FIGS. 5(a) to 5(d) are each a schematic sectional view illustrating an alignment state of liquid crystal molecules in an OCB mode. The OCB mode is a display mode in which the liquid crystal layer 12 is constituted by so-called bend alignment. As shown in FIG. 5(c), the bend alignment refers to an alignment state wherein: nematic liquid crystal molecules are aligned at a substantially parallel angle (alignment angle) in the vicinity of a substrate; the alignment angle of the liquid crystal molecules becomes vertical to a substrate plane toward the center of the liquid crystal layer; and the alignment angle changes successively and continuously to parallel with a facing substrate surface away from the center of the liquid crystal layer. Further, the bend alignment refers to an alignment state having no twist structure across the entire liquid crystal layer. Such bend alignment is formed as follows. As shown in FIG. 5(a), the liquid crystal molecules have a substantially homogeneous alignment in a state without application of an electric field or the like (initial state). However, the liquid crystal molecules each have a pretilt angle, and a pretilt angle in the vicinity of the substrate is different from a pretilt angle in the vicinity of the opposite substrate. A predetermined bias voltage (generally 1.5 V to 1.9 V) is applied (low voltage application) to the liquid crystal molecules, to thereby realize spray alignment as shown in FIG. 5(b) and then into bend alignment as shown in FIG. 5(c). Then, a display voltage (generally 5 V to 7 V) is applied (high voltage application) to the state of bend alignment, and thus the liquid crystal molecules align/stand substantially vertical to the substrate surface as shown in FIG. 5(d). In a normally white display mode, light entering the liquid crystal layer in a state shown in FIG. 5(d) during high voltage application through the polarizing plate 30 advances without changing a polarization direction and is absorbed by the polarizing plate 30', to thereby display a dark state. Upon reduction of a display voltage, the alignment is returned to bend alignment to display a bright state by an alignment restraining force of rubbing treatment. A display voltage is changed to control inclination of the liquid crystal molecules, so as to change an intensity of light transmission from the polarizing plate. As a result, display of gradation can be realized. The liquid crystal display apparatus provided with an OCB mode liquid crystal cell allows switching of phase transition from a spray alignment state to a bend alignment state at a very high speed, and has excellent dynamic image display characteristics compared to those of a liquid crystal display apparatus provided with a liquid crystal cell of another drive mode such as a TN mode or an IPS mode.

B. Optical Compensation Element

Figure 6A:
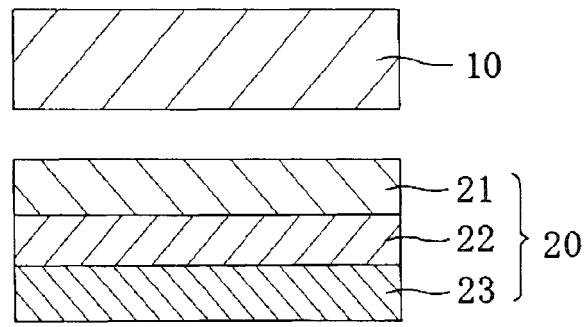
FIGS. 6(a) to 6(c) Schematic sectional views of optical compensation elements respectively used for a liquid crystal display apparatus according to a preferred embodiment of the present invention.
Figure 6B:
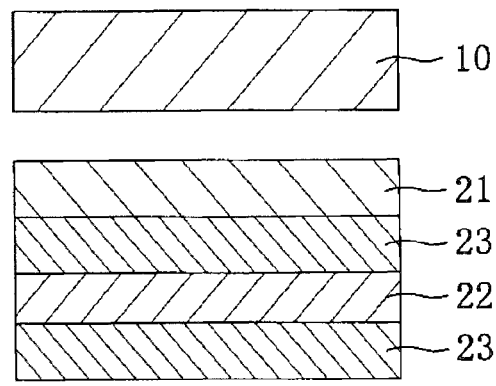
Figure 6C:
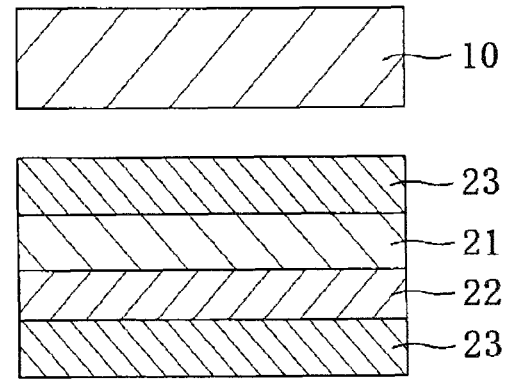

FIGS. 6(a) to 6(c) are each a schematic sectional view illustrating a preferred example of the optical compensation element 20 used in the present invention. The optical compensation element 20 includes: an optical compensation layer 21; and a polarizer 22 and/or a transparent protective layer 23 as required. Hereinafter, each member will be described in more detail.

B-1. Optical Compensation Layer

An in-plane retardation (front retardation) $\Delta nd$ of the optical compensation layer 21 may be optimized in accordance with the display mode of the liquid crystal cell. The $\Delta nd$ is preferably 5 nm or more, more preferably 10 nm or more, most preferably 15 nm or more, for example. A $\Delta nd$ of less than 5 nm often degrades contrast in an oblique direction. Meanwhile, the $\Delta nd$ is preferably 400 nm or less, more preferably 300 nm or less, furthermore preferably 200 nm or less, particularly preferably 150 nm or less, especially preferably 100 nm or less, most preferably 80 nm or less. A $\Delta nd$ exceeding 400 nm often reduces a viewing angle. More specifically, the liquid crystal cell employing a VA mode has a $\Delta nd$ of preferably 5 to 150 nm, more preferably 10 to 100 nm, most preferably 15 to 80 nm. The liquid crystal cell employing an OCB mode has a $\Delta nd$ of preferably 5 to 400 nm, more preferably 10 to 300 nm, most preferably 15 to 200 nm. Note that, the $\Delta nd$ can be determined from an equation: $\Delta nd=(nx-ny)\times d$. Here, nx represents a refractive index of the optical compensation layer in a slow axis direction, and ny represents a refractive index of the optical compensation layer in a fast axis direction. d(nm) represents a thickness of the optical compensation layer. The $\Delta nd$ is generally measured using light of a wavelength of 590 nm. The slow axis refers to a direction which shows the maximum in-plane refractive index in the plane of the film, and the fast axis refers to a direction perpendicular to the slow axis in the same plane.

Further, a thickness direction retardation Rth of the optical compensation layer 21 may be optimized in accordance with the display mode of the liquid crystal cell as well. The Rth is preferably 10 nm or more, more preferably 20 nm or more, most preferably 50 nm or more, for example. An Rth of less than 10 nm often degrades contrast in an oblique direction. Meanwhile, the Rth is preferably 1,000 nm or less, more preferably 500 nm or less, furthermore preferably 400 nm or less, particularly preferably 300 nm or less, especially preferably 280 nm or less, most preferably 260 nm or less. An Rth exceeding 1,000 nm may excessively increase optical compensation, thereby resulting in degradation of contrast in an oblique direction. More specifically, the liquid crystal cell employing a VA mode has an Rth of preferably 10 to 300 nm, more preferably 20 to 280 nm, most preferably 50 to 260 nm. The liquid crystal cell employing an OCB mode has an Rth of preferably 10 to 1,000 nm, more preferably 20 to 500 nm, most preferably 50 to 400 nm. Note that, the Rth can be determined from an equation: $Rth=(nx-nz)\times d$. Here, nz represents a refractive index of the film (optical compensation layer) in a thickness direction. The Rth is also generally measured using light of a wavelength of 590 nm.

An Nz coefficient ($=Rth/\Delta nd$) of the optical compensation layer 21 may be optimized in accordance with the display mode of the liquid crystal cell. The Nz coefficient is preferably 2 to 20, more preferably 2 to 10, furthermore preferably 2 to 8, most preferably 2 to 6, for example. More specifically, the liquid crystal cell employing a VA mode has an Nz coefficient of preferably 2 to 10, more preferably 2 to 8, most preferably 2 to 6. The liquid crystal cell employing an OCB mode has an Nz coefficient of preferably 2 to 20, more preferably 2 to 10, most preferably 2 to 8. Further, the optical compensation layer 21 has a refractive index profile of nx>ny>nz. The optical compensation layer having such optical characteristics (that is, $\Delta nd$, Rth, refractive index profile, and Nz coefficient) is arranged on the opposite side against the color filter substrate having a high haze value with respect to the liquid crystal layer, to thereby obtain a liquid crystal display apparatus allowing exceptional viewing angle compensation and exhibiting exceptional contrast in an oblique direction.

The optical compensation layer 21 may be a monolayer or a laminate of two or more layers. A material constituting each layer of the laminate as the optical compensation layer 21 and a thickness of each layer thereof may be arbitrarily set as long as the entire laminate has the above optical characteristics.

The optical compensation layer may have any suitable thickness as long as the effects of the present invention can be provided. The optical compensation layer generally has a thickness of 1 to 20 μm, preferably 1 to 12 μm, more preferably 1 to 8 μm, to thereby contribute to reduction in thickness of the liquid crystal display apparatus and obtain an optical compensation layer allowing excellent viewing angle compensation performance and exhibiting uniform retardation. The present invention may realize excellent viewing angle compensation using an optical compensation layer (optical compensation element) having a considerably small thickness compared to that of a conventional retardation plate and using such an optical compensation layer (optical compensation element) alone.

B-2. Material Constituting Optical Compensation Layer

Any suitable materials may be employed as a material constituting the optical compensation layer as long as the optical compensation layer has the above optical characteristics. An example of such a material includes a non-liquid crystalline material. The material is particularly preferably a non-liquid crystalline polymer. The non-liquid crystalline material differs from a liquid crystalline material and may form an optically uniaxial film with nx>nz or ny>nz as property of the non-liquid crystalline material, regardless of alignment property of the substrate. As a result, the non-liquid crystalline material may employ not only a substrate subjected to alignment treatment, but also a substrate not subjected to alignment treatment in a step of forming the optical compensation layer. Further, a step of applying an alignment film on a substrate surface, a step of laminating an alignment film, or the like may be omitted even when a substrate not subjected to alignment treatment is employed.

A preferred example of the non-liquid crystalline material includes a polymer such as polyamide, polyimide, polyester, polyetherketone, polyamideimide, or polyesterimide since such a material has excellent thermal resistance, excellent chemical resistance, excellent transparency, and sufficient rigidity. One type of polymer may be used, or a mixture of two or more types thereof having different functional groups such as a mixture of polyaryletherketone and polyamide may be used. Of those, polyimide is particularly preferred in view of high transparency, high aligning property, and high extension.

A molecular weight of the polymer is not particularly limited. However, the polymer has a weight average molecular weight (Mw) of preferably within a range of 1,000 to 1,000,000, more preferably within a range of 2,000 to 500,000, for example.

Polyimide which has high in-plane alignment and which is soluble in an organic solvent is preferred as polyimide used in the present invention, for example. More specifically, a polymer disclosed in JP 2000-511296 A, containing a condensation polymerization product of 9,9-bis(aminoaryl) fluorene and aromatic tetracarboxylic dianhydride, and containing at least one repeating unit represented by the following formula (1) can be used.

[Chemical formula 1]

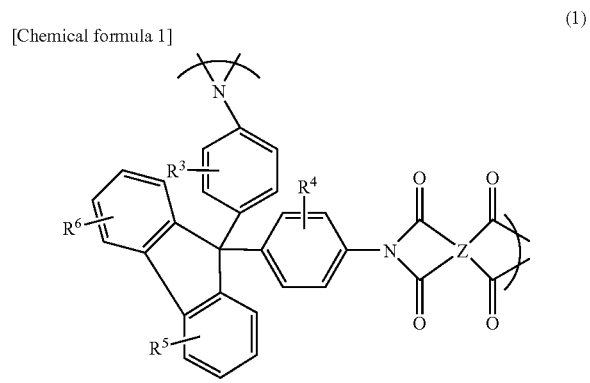

(1)

In the above formula (1), $R^3$ to $R^6$ independently represent at least one type of substituent selected from hydrogen, a halogen, a phenyl group, a phenyl group substituted with 1 to 4 halogen atoms or 1 to 4 alkyl groups each having 1 to 10 carbon atoms, and an alkyl group having 1 to 10 carbon atoms. Preferably, $R^3$ to $R^6$ independently represent at least one type of substituent selected from a halogen, a phenyl group, a phenyl group substituted with 1 to 4 halogen atoms or 1 to 4 alkyl groups each having 1 to 10 carbon atoms, and an alkyl group having 1 to 10 carbon atoms.

In the above formula (1), Z represents a tetravalent aromatic group having 6 to 20 carbon atoms, and preferably represents a pyromellitic group, a polycyclic aromatic group, a derivative of the polycyclic aromatic group, or a group represented by the following formula (2), for example.

[Chemical formula 2]

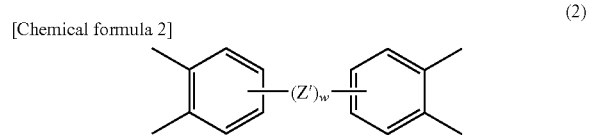

(2)

In the above formula (2), Z' represents a covalent bond, a $C(R^7)_2$ group, a CO group, an O atom, an S atom, an $SO_2$ group, an $Si(C_2H_5)_2$ group, or an $NR^8$ group. A plurality of Z's may be the same or different from each other. w represents an integer of 1 to 10. $R^7$s independently represent hydrogen or a $C(R^9)_3$ group. $R^8$ represents hydrogen, an alkyl group having 1 to about 20 carbon atoms, or an aryl group having 6 to 20 carbon atoms. A plurality of $R^8$s may be the same or different from each other. $R^9$s independently represent hydrogen, fluorine, or chlorine.

An example of the polycyclic aromatic group includes a tetravalent group derived from naphthalene, fluorene, benzofluorene, or anthracene. An example of the substituted derivative of the polycyclic aromatic group includes the above polycyclic aromatic group substituted with at least a group selected from an alkyl group having 1 to 10 carbon atoms, a fluorinated derivative thereof, and a halogen such as F or Cl.

Other examples of the polyimide include: a homopolymer disclosed in JP 08-511812 A and containing a repeating unit represented by the following general formula (3) or (4); and polyimide disclosed therein and containing a repeating unit represented by the following general formula (5). Note that, polyimide represented by the following formula (5) is a preferred form of the homopolymer represented by the following formula (3).

[Chemical formula 3]

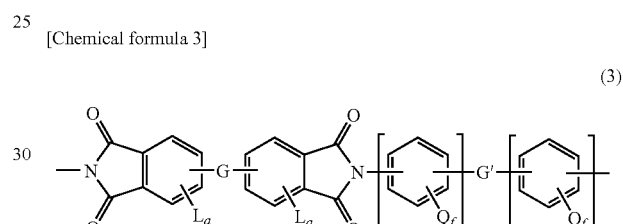

(3)

[Chemical formula 4]

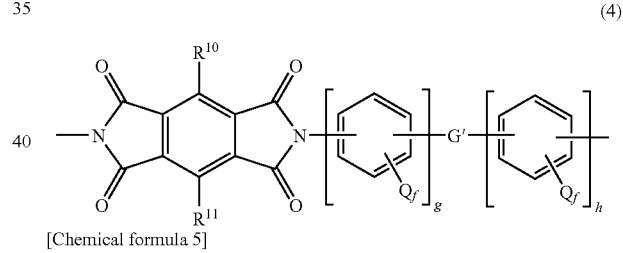

(4)

[Chemical formula 5]

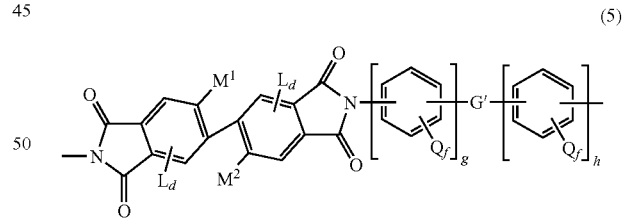

(5)

In the above general formulae (3) to (5), G and G' independently represent a covalent bond, a $CH_2$ group, a $C(CH_3)_2$ group, a $C(CF_3)_2$ group, a $C(CX_3)_2$ group (wherein, X represents a halogen), a CO group, an O atom, an S atom, an $SO_2$ group, an $Si(CH_2CH_3)_2$ group, or an $N(CH_3)$ group, for example. G and G' may be the same or different from each other.

In the above formulae (3) and (5), L is a substituent, and d and e each represent the number of the substituents. L represents a halogen, an alkyl group having 1 to 3 carbon atoms, a halogenated alkyl group having 1 to 3 carbon atoms, a phenyl group, or a substituted phenyl group, for example. A plurality of Ls may be the same or different from each other. An example of the substituted phenyl group includes a substituted phenyl group having at least one type of substituent selected from a halogen, an alkyl group having 1 to 3 carbon atoms, and a halogenated alkyl group having 1 to 3 carbon atoms, for example. Examples of the halogen include fluorine, chlorine, bromine, and iodine. d represents an integer of 0 to 2, and e represents an integer of 0 to 3.

In the above formulae (3) to (5), Q is a substituent, and f represents the number of the substituents. Q represents an atom or a group selected from hydrogen, a halogen, an alkyl group, a substituted alkyl group, a nitro group, a cyano group, a thioalkyl group, an alkoxy group, an aryl group, a substituted aryl group, an alkylester group, and a substituted alkylester group, for example. A plurality of Qs may be the same or different from each other. Examples of the halogen include fluorine, chlorine, bromine, and iodine. An example of the substituted alkyl group includes a halogenated alkyl group. An example of the substituted aryl group includes a halogenated aryl group. f represents an integer of 0 to 4, and g represents an integer of 0 to 3. h represents an integer of 1 to 3. g and h are each preferably larger than 1.

In the above formula (4), $R^{10}$ and $R^{11}$ independently represent an atom or a group selected from hydrogen, a halogen, a phenyl group, a substituted phenyl group, an alkyl group, and a substituted alkyl group. Preferably, $R^{10}$ and $R^{11}$ independently represent a halogenated alkyl group.

In the above formula (5), $M^1$ and $M^2$ independently represent a halogen, an alkyl group having 1 to 3 carbon atoms, a halogenated alkyl group having 1 to 3 carbon atoms, a phenyl group, or a substituted phenyl group, for example. Examples of the halogen include fluorine, chlorine, bromine, and iodine. An example of the substituted phenyl group includes a substituted phenyl group having at least one type of substituent selected from the group consisting of a halogen, an alkyl group having 1 to 3 carbon atoms, and a halogenated alkyl group having 1 to 3 carbon atoms.

A specific example of the polyimide represented by the above formula (3) includes a compound represented by the following formula (6).

[Chemical formula 6]

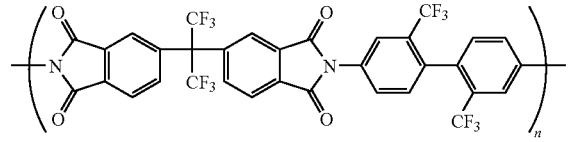

(6)

Another example of the polyimide includes a copolymer prepared through arbitrary copolymerization of acid dianhydride having a skeleton (repeating unit) other than that as described above and diamine.

An example of the acid dianhydride includes an aromatic tetracarboxylic dianhydride. Examples of the aromatic tetracarboxylic dianhydride include pyromellitic dianhydride, benzophenone tetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include: pyromellitic dianhydride; 3,6-diphenyl pyromellitic dianhydride; 3,6-bis(trifluoromethyl)pyromellitic dianhydride; 3,6-dibromopyromelliticdianhydride; and 3,6-dichloropyromellitic dianhydride. Examples of the benzophenone tetracarboxylic dianhydride include: 3,3',4,4'-benzophenone tetracarboxylic dianhydride; 2,3,3',4'-benzophenone tetracarboxylic dianhydride; and 2,2',3,3'-benzophenone tetracarboxylic dianhydride. Examples of the naphthalene tetracarboxylic dianhydride include: 2,3,6,7-naphthalene tetracarboxylic dianhydride; 1,2,5,6-naphthalene tetracarboxylic dianhydride; and 2,6-dichloronaphthalene-1,4,5,8-tetracarboxylic dianhydride. Examples of the heterocyclic aromatic tetracarboxylic dianhydride include: thiophene-2,3,4,5-tetracarboxylic dianhydride; pyrazine-2,3,5,6-tetracarboxylic dianhydride; and pyridine-2,3,5,6-tetracarboxylic dianhydride. Examples of the 2,2'-substituted biphenyltetracarboxylic dianhydride include: 2,2'-dibromo-4,4',5,5'-biphenyltetracarboxylic dianhydride; 2,2'-dichloro-4,4',5,5'-biphenyltetracarboxylic dianhydride; and 2,2'-bis(trifluoromethyl)-4,4',5,5'-biphenyltetracarboxylic dianhydride.

Further examples of the aromatic tetracarboxylic dianhydride include: 3,3',4,4'-biphenyltetracarboxylic dianhydride; bis(2,3-dicarboxyphenyl)methane dianhydride; bis(2,5,6-trifluoro-3,4-dicarboxyphenyl)methane dianhydride; 2,2-bis(3,4-dicarboxyphenyl)-1,1,1,3,3,3-hexafluoropropane dianhydride; 4,4'-bis(3,4-dicarboxyphenyl)-2,2-diphenylpropane dianhydride; bis(3,4-dicarboxyphenyl) ether dianhydride; 4,4'-oxydiphthalic dianhydride; bis(3,4-dicarboxyphenyl) sulfonic dianhydride; 3,3',4,4'-diphenylsulfone tetracarboxylic dianhydride; 4,4'-[4,4'-isopropylidene-di(p-phenyleneoxy)]bis(phthalic anhydride); N,N-(3,4-dicarboxyphenyl)-N-methylamine dianhydride; and bis(3,4-dicarboxyphenyl)diethylsilane dianhydride.

Of those, the aromatic tetracarboxylic dianhydride is preferably 2,2'-substituted biphenyltetracarboxylic dianhydride, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

An example of the diamine includes aromatic diamine. Specific examples of the aromatic diamine include benzenediamine, diaminobenzophenone, naphthalenediamine, heterocyclic aromatic diamine, and other aromatic diamines.

Examples of the benzenediamine include benzenediamines such as o-, m-, or p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone include 2,2'-diaminobenzophenone and 3,3'-diaminobenzophenone. Examples of the naphthalenediamine include 1,8-diaminonaphthalene and 1,5-diaminonaphthalene. Examples of the heterocyclic aromatic diamine include 2,6-diaminopyridine, 2,4-diaminopyridine, and 2,4-diamino-S-triazine.

Further examples of the aromatic diamine include: 4,4'-diaminobiphenyl; 4,4'-diaminodiphenylmethane; 4,4'-(9-fluorenylidene)-dianiline; 2,2'-bis(trifluoromethyl)-4,4'-diaminobiphenyl; 3,3'-dichloro-4,4'-diaminodiphenylmethane; 2,2'-dichloro-4,4'-diaminobiphenyl; 2,2',5,5'-tetrachlorobenzidine; 2,2-bis(4-aminophenoxyphenyl)propane; 2,2-bis(4-aminophenyl)propane; 2,2-bis(4-aminophenyl)-1,1,1,3,3,3-hexafluoropropane; 4,4'-diaminodiphenyl ether; 3,4'-diaminodiphenyl ether; 1,3-bis(3-aminophenoxy)benzene; 1,3-bis(4-aminophenoxy)benzene; 1,4-bis(4-aminophenoxy)benzene; 4,4'-bis(4-aminophenoxy)biphenyl; 4,4'-bis(3-aminophenoxy)biphenyl; 2,2-bis[4-(4-aminophenoxy)phenyl]propane; 2,2-bis[4-(4-aminophenoxy)phenyl]-1,1,1, 3,3,3-hexafluoropropane; 4,4'-diaminodipheny thioether; and 4,4'-diaminodiphenylsulfone.

An example of the polyetherketone includes polyaryletherketone disclosed in JP 2001-049110 A and represented by the following general formula (7).

[Chemical formula 7]

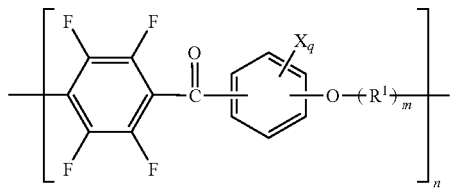

(7)

In the above formula (7), X represents a substituent, and q represents the number of the substituents. X represents a halogen atom, a lower alkyl group, a halogenated alkyl group, a lower alkoxy group, or a halogenated alkoxy group, for example. A plurality of Xs may be the same or different from each other.

Examples of the halogen atom include a fluorine atom, a bromine atom, a chlorine atom, and an iodine atom. Of those, a fluorine atom is preferred. The lower alkyl group is preferably an alkyl group having a straight chain or branched chain of 1 to 6 carbon atoms, more preferably an alkyl group having a straight chain or branched chain of 1 to 4 carbon atoms. More specifically, the lower alkyl group is preferably a methyl group, an ethyl group, a propyl group, an isopropyl group, a butyl group, an isobutyl group, a sec-butyl group, or a tert-butyl group, and particularly preferably a methyl group or an ethyl group. An example of the halogenated alkyl group includes a halide of the above lower alkyl group such as a trifluoromethyl group. The lower alkoxy group is preferably an alkoxy group having a straight chain or branched chain of 1 to 6 carbon atoms, more preferably an alkoxy group having a straight chain or branched chain of 1 to 4 carbon atoms. More specifically, the lower alkoxy group is preferably a methoxy group, an ethoxy group, a propoxy group, an isopropoxy group, a butoxy group, an isobutoxy group, a sec-butoxy group, or a tert-butoxy group, and particularly preferably a methoxy group or an ethoxy group. An example of the halogenated alkoxy group includes a halide of the above lower alkoxy group such as a trifluoromethoxy group.

In the above formula (7), q is an integer of 0 to 4. In the above formula (7), preferably, q=0, and a carbonyl group and an oxygen atom of ether bonded to both ends of a benzene ring are located in para positions.

In the above formula (7), $R^1$ is a group represented by the following formula (8), and m is an integer of 0 or 1.

[Chemical formula 8]

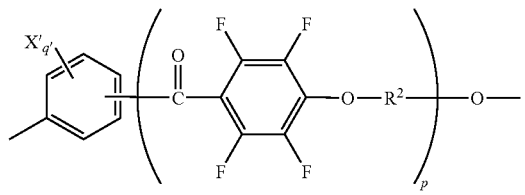

(8)

In the above formula (8), X' represents a substituent which is the same as X in the above formula (7), for example. In the above formula (8), a plurality of X's may be the same or different from each other. q' represents the number of the substituents X'. q, is an integer of 0 to 4, and q, is preferably 0. p is an integer of 0 or 1.

In the above formula (8), $R^2$ represents a divalent aromatic group. Examples of the divalent aromatic group include: an o-, m-, or p-phenylene group; and a divalent group derived from naphthalene, biphenyl, anthracene, o-, m-, or p-terphenyl, phenanthrene, dibenzofuran, biphenyl ether, or biphenyl sulfone. In the divalent aromatic group, hydrogen directly bonded to an aromatic group may be substituted with a halogen atom, a lower alkyl group, or a lower alkoxy group. Of those, $R^2$ is preferably an aromatic group selected from groups represented by the following formulae (9) to (15).

[Chemical formula 9]

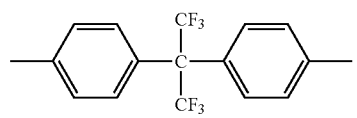

(9)

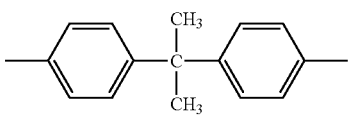

(10)

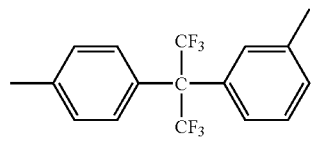

(11)

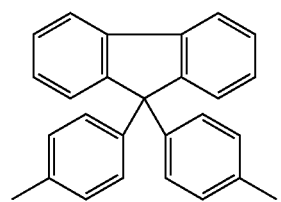

(12)

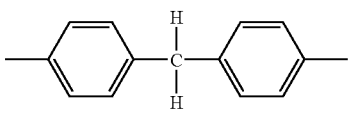

(13)

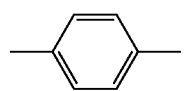

(14)

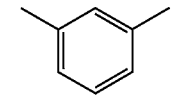

(15)

In the above formula (7), $R^1$ is preferably a group represented by the following formula (16). In the following formula (16), $R^2$ and p are defined as those in the above formula (8).

[Chemical formula 10]

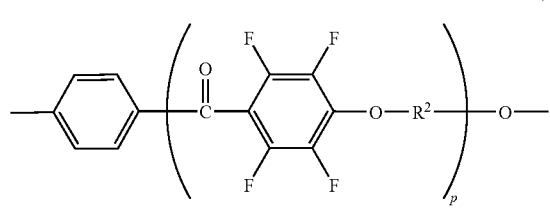
(16)

In the above formula (7), n represents a degree of polymerization. n falls within a range of 2 to 5,000, preferably within a range of 5 to 500, for example. Polymerization may involve polymerization of repeating units of the same structure or polymerization of repeating units of different structures. In the latter case, a polymerization form of the repeating units may be block polymerization or random polymerization.

Terminals of the polyaryletherketone represented by the above formula (7) are preferably a fluorine atom on a p-tetrafluorobenzoylene group side and a hydrogen atom on an oxyalkylene group side. Such polyaryletherketone can be represented by the following general formula (17), for example. In the following formula (17), n represents the same degree of polymerization as that in the above formula (7).

[Chemical formula 11]

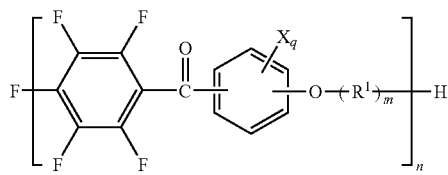
(17)

Specific examples of the polyaryletherketone represented by the above formula (7) include compounds represented by the following formulae (18) to (21). In each of the following formulae, n represents the same degree of polymerization as that in the above formula (7).

[Chemical formula 12]

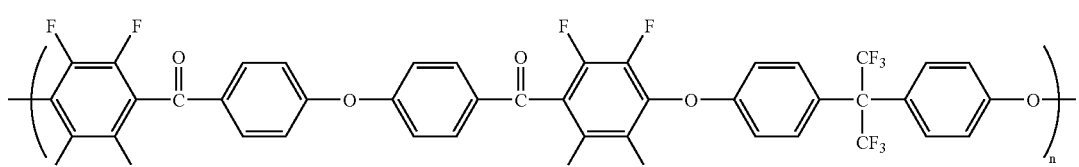
(18)

[Chemical formula 13]

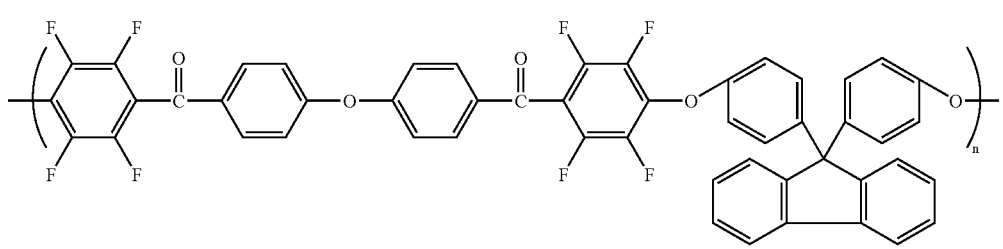
(19)

[Chemical formula 14]

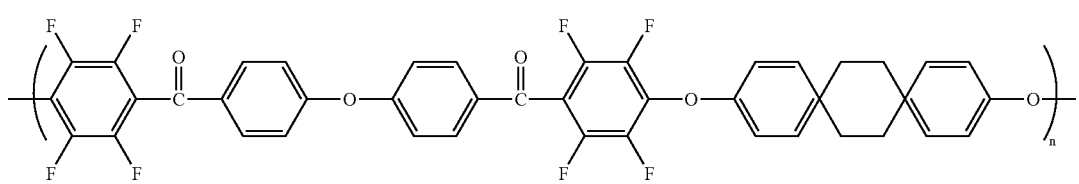
(20)

[Chemical formula 15]

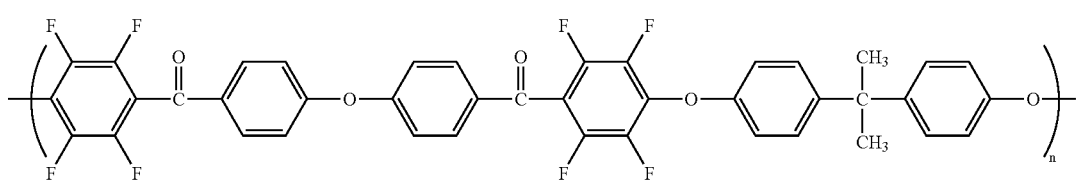
(21)

In addition, an example of polyamide or polyester includes polyamide or polyester disclosed in JP 10-508048 A. A repeating unit thereof can be represented by the following general formula (22), for example.

[Chemical formula 16]

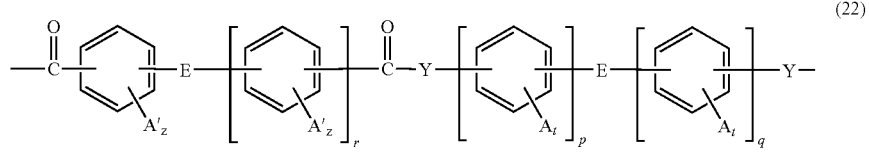

(22)

In the above formula (22), Y represents O or NH. E represents at least one selected from a covalent bond, an alkylene group having 2 carbon atoms, a halogenated alkylene group having 2 carbon atoms, a $CH_2$ group, a $C(CX_3)_2$ group (wherein, X is a halogen or hydrogen), a CO group, an O atom, an S atom, an $SO_2$ group, an $Si(R)_2$ group, and an N(R) group, for example. A plurality of Es may be the same or different from each other. In E, R is at least one of an alkyl group having 1 to 3 carbon atoms and a halogenated alkyl group having 1 to 3 carbon atoms, and is located in a meta or para position with respect to a carbonyl functional group or a Y group.

In the above formula (22), A and A' each represent a substituent, and t and z represent the numbers of the respective substituents. p represents an integer of 0 to 3, and q represents an integer of 1 to 3. r represents an integer of 0 to 3.

A is selected from hydrogen, a halogen, an alkyl group having 1 to 3 carbon atoms, a halogenated alkyl group having 1 to 3 carbon atoms, an alkoxy group represented by OR (wherein, R is defined as above), an aryl group, a substituted aryl group prepared through halogenation or the like, an alkoxycarbonyl group having 1 to 9 carbon atoms, an alkylcarbonyloxy group having 1 to 9 carbon atoms, an aryloxycarbonyl group having 1 to 12 carbon atoms, an arylcarbonyloxy group having 1 to 12 carbon atoms and its substituted derivatives, an arylcarbamoyl group having 1 to 12 carbon atoms, and arylcarbonylamino group having 1 to 12 carbon atoms and its substituted derivatives, for example. A plurality of As may be the same or different from each other. A' is selected from a halogen, an alkyl group having 1 to 3 carbon atoms, a halogenated alkyl group having 1 to 3 carbon atoms, a phenyl group, and a substituted phenyl group, for example. A plurality of A's may be the same or different from each other. Examples of the substituent on a phenyl ring of the substituted phenyl group include a halogen, an alkyl group having 1 to 3 carbon atoms, a halogenated alkyl group having 1 to 3 carbon atoms, and the combination thereof. t represents an integer of 0 to 4, and z represents an integer of 0 to 3.

The repeating unit of the polyamide or polyester represented by the above formula (22) is preferably a repeating unit represented by the following general formula (23).

[Chemical formula 17]

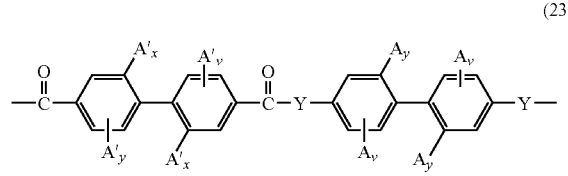

(23)

In the above formula (23), A, A', and Y are defined as those in the above formula (22). v represents an integer of 0 to 3, preferably an integer of 0 to 2. x and y are each 0 or 1, but are not both 0.

B-3. Polarizer

As described above, the optical compensation element 20 further includes the polarizer 22 as required. As shown in FIGS. 6(a) to 6(c), the polarizer 22 is provided such that the optical compensation layer 21 is arranged on a side of the liquid crystal cell 10. In the case where the optical compensation element includes a polarizer, the polarizing plate 30 may be omitted in the liquid crystal display apparatus, thereby contributing to reduction in thickness of the liquid crystal display apparatus. The optical compensation element including a polarizer may be provided as a member comparable to the so-called polarizing plate attached with a retardation plate.

Any suitable polarizer may be employed as the polarizer depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dechlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 5 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

B-4. Transparent Protective Layer

As described above, the optical compensation element 20 further includes the transparent protective layer 23 as required. As shown in FIGS. 6(a) to 6(c), the transparent protective layer 23 is arranged on an outer side (that is, as an outermost layer) of the polarizer 22. The transparent protective layer is provided, to thereby prevent degradation of the polarizer. As required, another transparent protective layer may be arranged between the optical compensation layer 21 and the polarizer 22 (see FIG. 6(b)), and/or between the optical compensation layer 21 and the liquid crystal cell 10 (see FIG. 6(c)).

Any suitable protective layers may be employed as the transparent protective layer depending on the purpose. The transparent protective layer is composed of a plastic film having excellent transparency, mechanical strength, thermal stability, water shielding property, isotropy, and the like, for example. Specific examples of a resin constituting the plastic film include anacetate resin such as triacetylcellulose (TAC), a polyester resin, a polyether sulfone resin, a polysulfone resin, a polycarbonate resin, a polyamide resin, a polyimide resin, a polyolefin resin, an acrylic resin, a polynorbornene resin, a cellulose resin, a polyallylate resin, a polystyrene resin, a polyvinyl alcohol resin, and a mixture thereof. A further example thereof includes an acrylic-based, urethane-based, acrylic urethane-based, epoxy-based, or silicone-based thermosetting resin or UV-curing resin. Of those, a TAC film subjected to surface saponization treatment with alkali or the like is preferred in view of polarization characteristics and durability.

Further, a polymer film formed from a resin composition described in JP 2001-343529 A (WO 01/37007) may be used as a transparent protective layer, for example. More specifically, the film is formed from a mixture of a thermoplastic resin having a substituted imide group or unsubstituted imide group on a side chain, and a thermoplastic resin having a substituted phenyl group or unsubstituted phenyl group and a cyano group on a side chain. A specific example thereof includes a resin composition containing an alternate copolymer of isobutene and N-methylene maleimide, and an acrylonitrile/styrene copolymer. An extruded product of such a resin composition may be used, for example.

The transparent protective layer is by definition transparent and preferably has no color. More specifically, the transparent protective layer has a thickness direction retardation Rth of preferably −90 nm to +75 nm, more preferably −80 nm to +60 nm, most preferably −70 nm to +45 nm. A thickness direction retardation Rth of the transparent protective layer falling within the above range may eliminate optical coloring of the polarizer attributed to the protective layer.

A thickness of the protective layer may be arbitrarily set depending on the purpose. A thickness of the protective layer is generally 500 μm or less, preferably 5 to 300 μm, more preferably 5 to 150 μm.

B-5. Method of Producing Optical Compensation Element (Method of Forming Optical Compensation Layer)

Next, a method of producing the optical compensation element (method of forming the optical compensation layer) will be described. Any suitable methods may be employed as the method of producing the optical compensation element as long as an optical compensation element having the above optical characteristics can be obtained. The production method generally includes the steps of: applying a solution of the non-liquid crystalline polymer on a substrate film; and forming a layer of the non-liquid crystalline polymer by removing a solvent in the solution. When the optical compensation element is constituted by the optical compensation layer (optical compensation film) alone, the formed optical compensation layer is peeled off from the substrate film, to thereby obtain an optical compensation element. When the optical compensation element includes the polarizer and the optical compensation layer, the production method further includes a step of attaching the polarizer onto a surface of the substrate film on which an optical compensation layer is not formed.

Any suitable films may be employed as the substrate film. A typical example of the substrate film includes a plastic film used for the protective layer of the polarizing plate described in the above section B-4.

The solvent of the application solution is not particularly limited. Examples of the solvent include: halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide and dimethylacetamide; nitrile-based solvents such as acetonitrile and butyronitrole; ether-based solvents such as diethyl ether, dibutyl ether, and tetrahydrofuran; and carbon disulfide, ethyl cellosolve, and butyl cellosolve. Of those, methyl isobutyl ketone is preferred because it has high solubility to non-liquid crystalline materials and does not corrode the substrate. The solvent may be used alone or in combination of two or more types thereof.

Any suitable concentrations of the non-liquid crystalline polymer in the application liquid may be employed as long as the above optical compensation layer can be obtained and the solution can be applied on the film. For example, the solution contains preferably 5 to 50 parts by weight, more preferably 10 to 40 parts by weight of the non-liquid crystalline polymer with respect to 100 parts by weight of the solvent. The solution having a concentration within the above range has a viscosity that facilitates application thereof.

The application solution may further contain various additives such as stabilizers, plasticizers, and metals as required.

The application solution may further contain other resin as required. Examples of the other resin include various general-purpose resins, engineering plastics, thermoplastic resins, and thermosetting resins. The use of such resins allows formation of an optical compensation layer having appropriate mechanical strength or durability depending on the purpose.

Examples of the general-purpose resins include polyethylene (PE), polypropylene (PP), polystyrene (PS), polymethyl methacrylate (PMMA), an ABS resin, and an AS resin. Examples of the engineering plastics include polyacetate (POM), polycarbonate (PC), polyamide (PA: nylon), polyethylene terephthalate (PET), and polybutylene terephthalate (PBT). Examples of the thermoplastic resins include polyphenylene sulfide (PPS), polyethersulfone (PES), polyketone (PK), polyimide (PI), polycyclohexanedimethanol terephthalate (PCT), polyarylate (PAR), and a liquid crystal polymer (LCP). Examples of the thermosetting resins include an epoxy resin and a phenol novolac resin.

The type and amount of the other resin added to the application solution may be set arbitrarily depending on the purpose. The resin is added in a ratio of preferably 0 to 50 mass %, more preferably 0 to 30 mass % with respect to the non-liquid crystalline polymer, for example.

Examples of a method of applying the solution include spin coating, roll coating, flow coating, printing, dip coating, flow casting, bar coating, and gravure coating. For application, lamination of a polymer layer may also be used.

After the application, the solvent in the solution is removed through evaporation by natural drying, air drying, or drying under heating (at 60 to 250° C., for example), to thereby form an optical compensation layer in a form of film.

In the production method, treatment for imparting optically biaxial characteristics (nx>ny>nz) is preferably carried out. Such treatment can assuredly provide an in-plane difference in refractive index (nx>ny), to thereby obtain an optical compensation layer having optically biaxial characteristics (nx>ny>nz). That is, an optical compensation layer having the optical characteristics described in the above section B-1 can be obtained. In other words, an optical compensation layer having optically uniaxial characteristics (nx=ny>nz) is obtained without such treatment. Examples of a method of imparting an in-plane difference in refractive index include the following two methods. A first method involves: applying the solution on a transparent polymer film subjected to stretching treatment; and drying the film. According to the first method, optically biaxial characteristics may be attained through shrinkage of the transparent polymer film. A second method involves: applying the solution on an unstretched transparent polymer film; drying the film; and stretching the film under heating. According to the second method, optically biaxial characteristics may be attained through stretching of the transparent polymer film. An example of the polymer film used for the methods includes the plastic film used for the transparent protective layer (section B-4).

Hereinafter, the present invention will be described in more detail by way of examples, but the present invention is not limited to the examples. Methods of measuring characteristics in the examples are as described below.

(1) Measurement of Retardation

Refractive indices nx, ny, and nz of a sample film were measured using an automatic birefringence analyzer (Automatic birefringence analyzer KOBRA21-ADH, manufactured by Oji Scientific Instruments), and an in-plane retardation Δnd, and a thickness direction retardation Rth were calculated. A measurement temperature was 23° C. and a measurement wavelength was 590 nm.

(2) Measurement of Haze

A haze value was measured at room temperature using "Hazemeter HM-150" (manufactured by Murakami Color Research Laboratory).

(3) Measurement of Color Shift

A color tone of the liquid crystal display apparatus was measured while an azimuth angle was changed from 0° to 360° in a direction of a polar angle of 60° using "EZ Contrast 160D" (trade name, manufactured by ELDIM SA). The results were plotted on an XY chromaticity diagram.

(4) Measurement of Contrast Ratio

A white image and a black image were displayed on the liquid crystal display apparatus produced, and a contrast ratio was measured using "EZ Contrast 160D" (trade name, manufactured by ELDIM SA).

REFERENCE EXAMPLE 1

Formation of Optical Compensation Layer

Polyimide represented by the following formula (6), synthesized from 2,2-bis(3,4-dicarboxyphenyl)hexafluoropropane dianhydride (6FDA) and 2,2'-bis(trifluoromethyl)-4,4'-diaminobiphenyl (TFMB), and having a weight average molecular weight (Mw) of 70,000 was dissolved in methyl isobutyl ketone, to thereby prepare a 15 wt % polyimide solution. Preparation of polyimide or the like was carried out by referring to a method described in a document (F. Li et al., Polymer 40 (1999) 4571-4583). Meanwhile, atriacetylcellulose (TAC) film (trade name "TF80UL", available from Fuji Photo Film Co., Ltd.) having a thickness of 80 μm was stretched in a width direction 1.3 times at 175° C. through fixed end stretching, to thereby produce a stretched TAC film having a thickness of 75 μm as a substrate film. The polyimide solution was applied onto the substrate film to be dried at 100° C. for 10 minutes. As a result, a laminated film having an optical compensation layer on the substrate film was obtained. The optical compensation layer had a thickness of 6 μm and a Δn (=nx−nz) of about 0.04. The optical compensation layer had a thickness direction retardation of 245 nm and an in-plane retardation of 55 nm. The optical compensation layer had optical characteristics of nx>ny>nz.

Meanwhile, a polyvinyl alcohol film was colored in an aqueous solution containing iodine and then uniaxially stretched 6 times between rolls of different speed ratios in an aqueous solution containing boric acid, to thereby obtain a polarizer. The obtained polarizer was attached onto the laminated film through an adhesive such that the substrate film (protective layer) is adjacent to the polarizer. Further, the polarizer was laminated such that a slow axis of the optical compensation layer and an absorption axis of the polarizer were substantially perpendicular to each other. Then, a commercially available TAC film (trade name "TF80UL", available from Fuji Photo Film Co., Ltd.) having a thickness of 80 μm as a protective layer was laminated through an adhesive on a surface of the polarizer on which the laminated film is not laminated, to thereby obtain a laminated optical film A having a structure of TAC protective layer/polarizer/TAC protective layer/optical compensation layer (polyimide layer).

[Chemical formula 18]

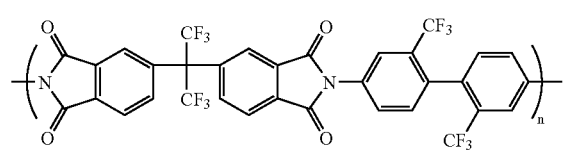

(6)

EXAMPLE 1

Figure 7:
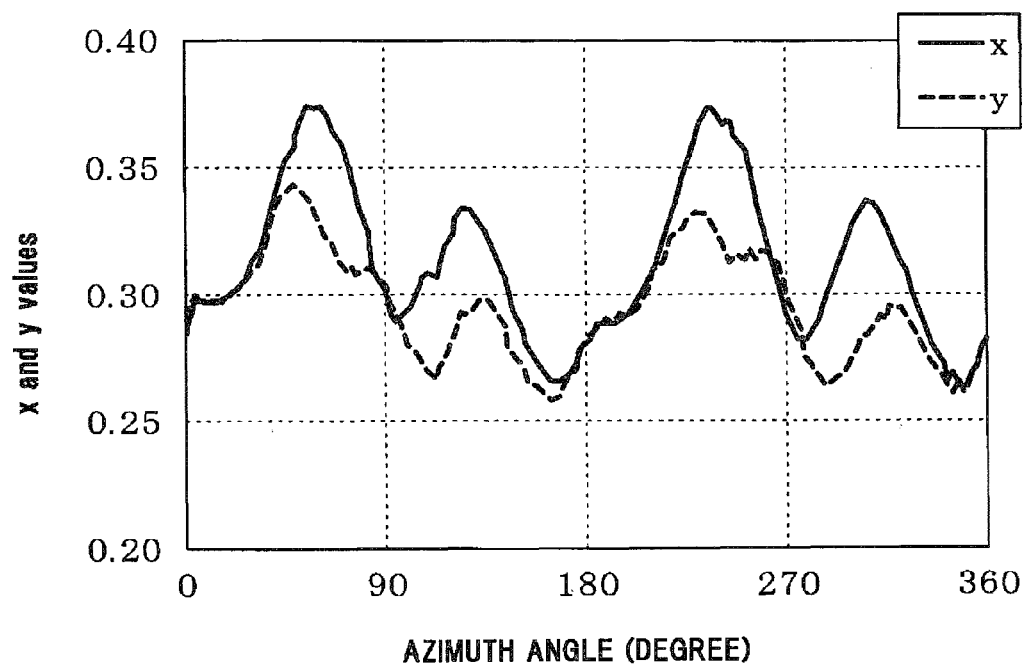
FIG. 7 Chromaticity diagram showing an amount of color shift of the liquid crystal display apparatus of Example 1 of the present invention.
Figure 10:
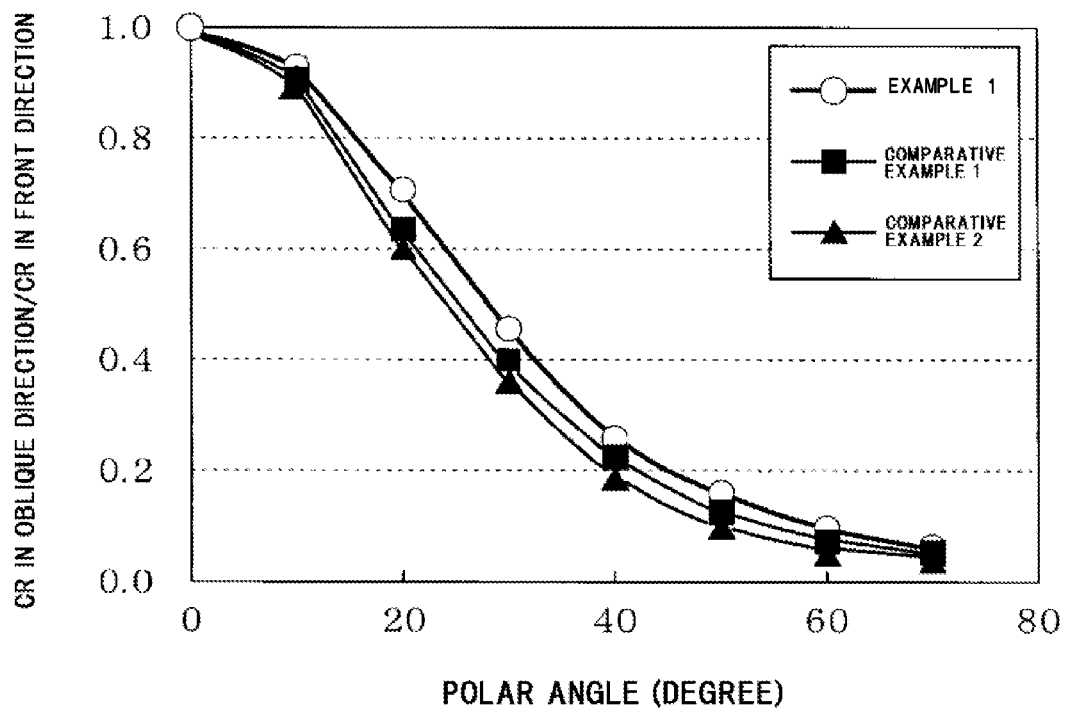
FIG. 10 Graph showing a relationship between a polar angle and a ratio of contrast in an oblique direction/contrast in a front direction of a liquid crystal display apparatus of Example 1 and liquid crystal display apparatuses of Comparative Examples 1 and 2.
Figure 11A:
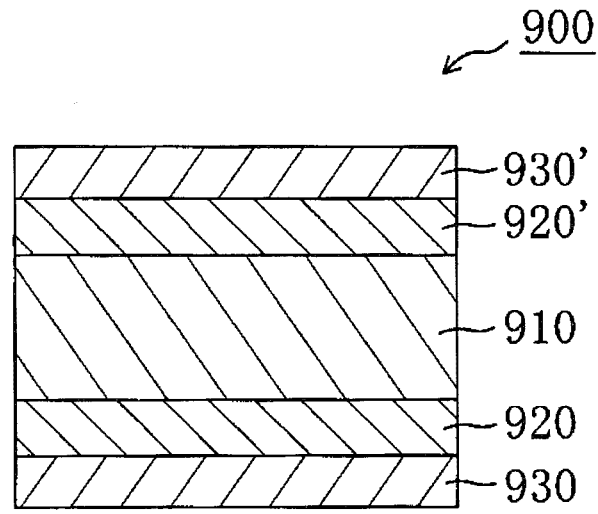
FIG. 11(a) Schematic sectional view of a conventional liquid crystal display apparatus.
Figure 11B:
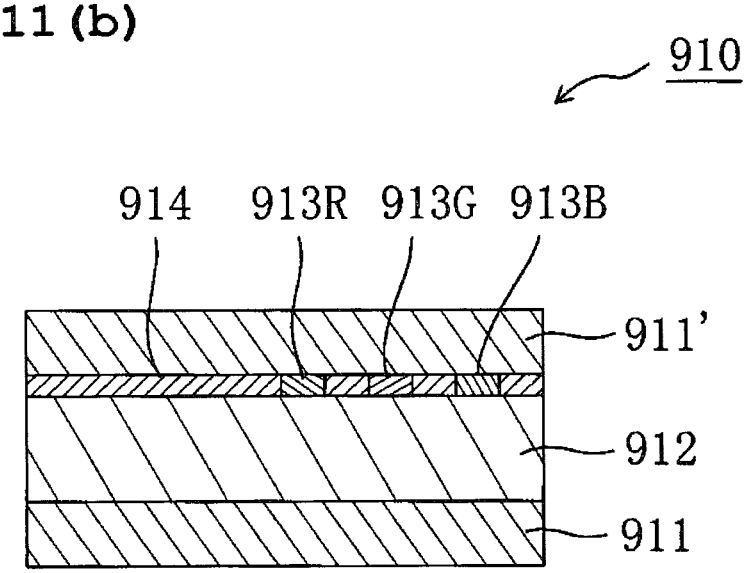
FIG. 11(b) Schematic sectional view of a liquid crystal cell used for the liquid crystal display apparatus of FIG. 11(a).

A liquid crystal cell was removed from a 26-inch liquid crystal monitor LC-26GD3 (installed with VA mode liquid crystal cell, manufactured by SHARP). The above laminated optical film A was attached to a backlight side of the liquid crystal cell (that is, the opposite side against the color filter with respect to the liquid crystal layer) through an acrylic adhesive (thickness of 20 μm) such that the optical compensation layer of the laminated optical film A was adjacent to the liquid crystal cell. Then, a polarizing plate D (trade name "SEG1224DU", available from Nitto Denko Corporation, thickness of 180 μm) having a structure of TAC protective layer/polarizer/TAC protective layer was attached to a viewer side of the liquid crystal cell (that is, the same side as the color filter with respect to the liquid crystal layer) through an acrylic adhesive (thickness of 20 μm). A haze value of the substrate provided with the color filter used for the liquid crystal panel was 16.2%. A liquid crystal display apparatus (1) was produced using the liquid crystal panel thus obtained. FIG. 7 shows the results of the color shift measurement of the liquid crystal display apparatus (1). Further, contrast in a front direction and contrast in an oblique direction (in a direction of azimuth angle of 45°) with varying polar angle from 0 to 70° of the liquid crystal display apparatus were measured. FIG. 10 shows a relationship between a polar angle and a ratio of contrast in an oblique direction/contrast in a front direction together with the results of Comparative Examples 1 and 2 described below.

COMPARATIVE EXAMPLE 1

Figure 8:
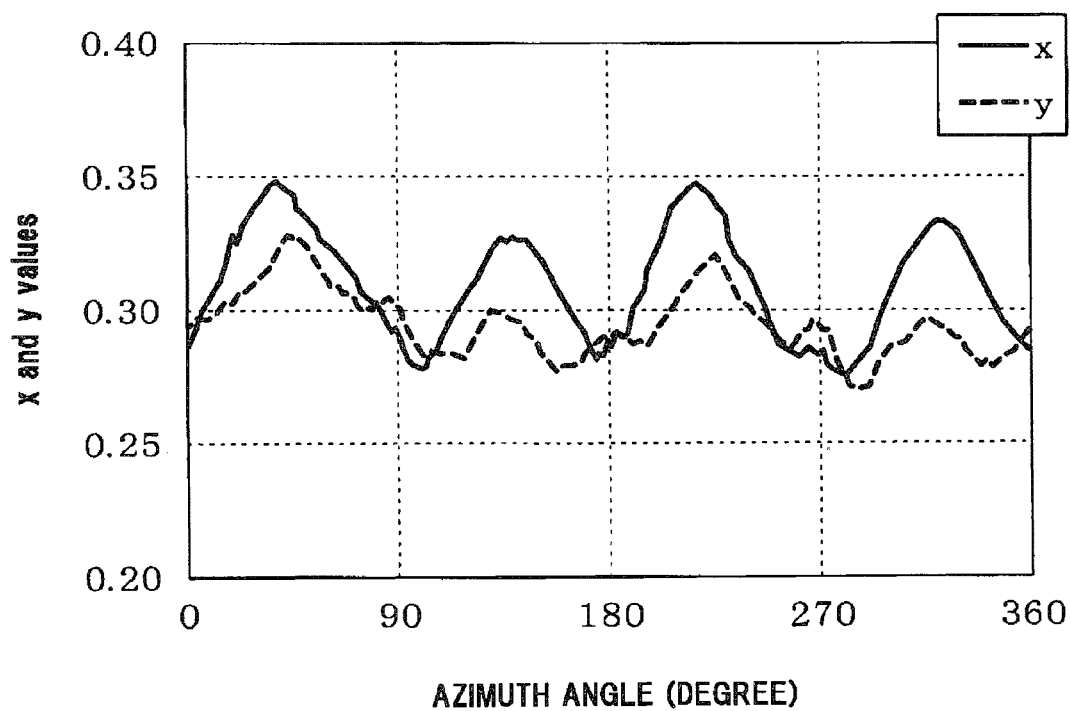
FIG. 8 Chromaticity diagram showing an amount of color shift of the liquid crystal display apparatus of Comparative Example 1.

The liquid crystal cell used in Example 1 was used. The laminated optical film A used in Example 1 was attached to a viewer side of the liquid crystal cell (that is, the same side as the color filter with respect to the liquid crystal layer) through an acrylic adhesive (thickness of 20 μm) such that the optical compensation layer of the laminated optical film A was adjacent to the liquid crystal cell. Then, the above polarizing plate D was attached to a backlight side of the liquid crystal cell (that is, the opposite side against the color filter with respect to the liquid crystal layer) through an acrylic adhesive (thickness of 20 μm), to thereby obtain a liquid crystal panel. A haze value of the substrate provided with the color filter used for the liquid crystal panel was 16.2%. A liquid crystal display apparatus (C1) was produced using the liquid crystal panel thus obtained. FIG. 8 shows the results of the color shift measurement of the liquid crystal display apparatus (C1). Further, contrast of the liquid crystal display apparatus was measured in the same manner as in Example 1. FIG. 10 shows a relationship between a polar angle and a ratio of contrast in an oblique direction/contrast in a front direction.

COMPARATIVE EXAMPLE 2

Figure 9:
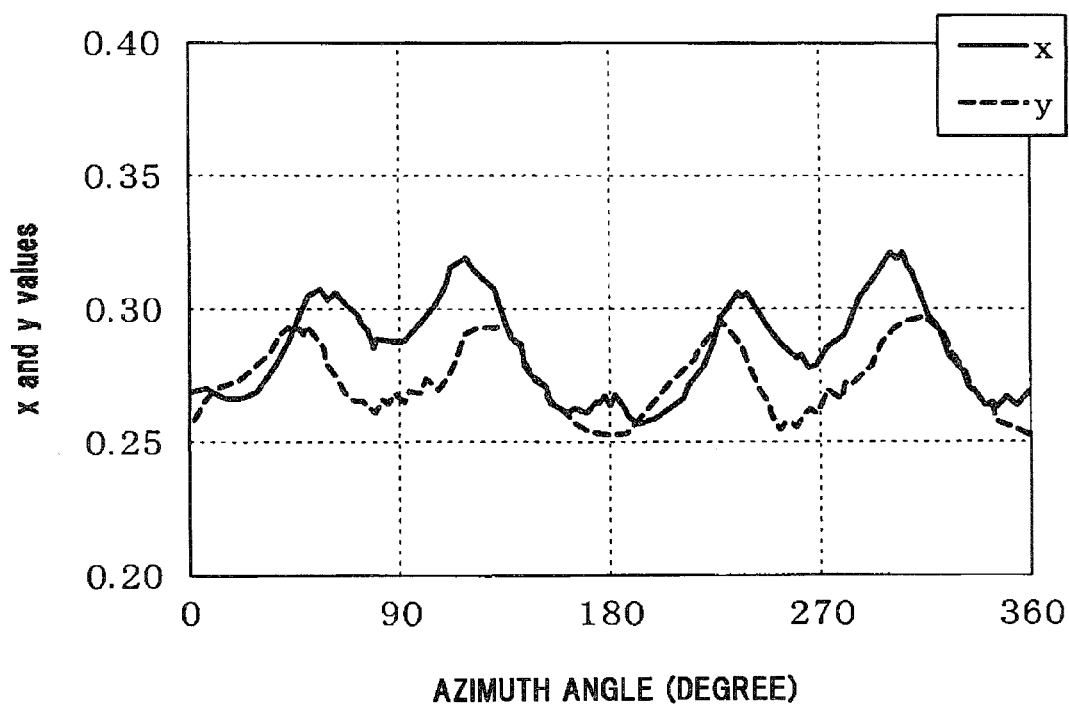
FIG. 9 Chromaticity diagram showing an amount of color shift of the liquid crystal display apparatus of Comparative Example 2.

A liquid crystal display panel was produced in the same manner as in Example 1 except that a 26-inch liquid crystal monitor KDL-L26RX2 (installed with VA mode liquid crystal cell, manufactured by SEC) was used. A haze value of the substrate provided with the color filter used for the liquid crystal panel was 2.8%. A liquid crystal display apparatus (C2) was produced using the liquid crystal panel thus obtained. FIG. 9 shows the results of the color shift measurement of the liquid crystal display apparatus (C2). Further, contrast of the liquid crystal display apparatus was measured in the same manner as in Example 1. FIG. 10 shows a relationship between a polar angle and a ratio of contrast in an oblique direction/contrast in a front direction.
(Evaluation)
FIGS. 7 to 9 reveal that: according to the liquid crystal display apparatus of Example 1, the chromaticity x value and y value substantially maintain a relationship of x>y independent of an azimuth angle. In contrast, according to the liquid crystal display apparatuses of Comparative Examples 1 and 2, the relationship between x value and y value varies depending on an azimuth angle. Such a change of the relationship between x value and y value makes a viewer to feel uncomfortable large color change. Further, FIG. 10 reveals that the liquid crystal display apparatus of Example 1 had contrast degradation in an oblique direction to a smaller extent than those of the liquid crystal display apparatuses of Comparative Examples.

As is clear from the thickness of the optical compensation layer of Reference Example 1, the optical compensation element used in the present invention has considerably small thickness compared to that of a conventional retardation plate (thickness of 140 μm, for example). Further, the liquid crystal display apparatus of Example 1 reveals that the use of one such element can realize exceptional viewing angle compensation, to thereby greatly contribute to reduction in thickness of the liquid crystal display apparatus.

INDUSTRIAL APPLICABILITY

The liquid crystal display apparatus according to the present invention may be suitably applied to a liquid crystal display TV, a cellular phone, and the like.

The invention claimed is:
1. A liquid crystal display apparatus comprising:
a liquid crystal cell including a first substrate provided with a color filter, a second substrate, and a liquid crystal layer as a display medium arranged between the first and second substrates; and
an optical compensation layer arranged on the second substrate,
wherein the optical compensation layer has a refractive index profile of nx>ny>nz,
wherein the first substrate has a haze value of more than 10% but less than or equal to 25%,
wherein the liquid crystal display apparatus comprises only one optical compensation layer,
wherein the color filter is arranged on a viewer side and the optical compensation layer is arranged on a backlight side,
wherein the liquid crystal cell employs a VA mode, and
wherein an in-plane retardation Δnd of the optical compensation layer is 5 nm to 150 nm, and a thickness direction retardation Rth of the optical compensation layer is 10 nm to 300 nm.
2. A liquid crystal display apparatus according to claim 1, wherein the optical compensation layer is formed from a non-liquid crystalline material.
3. A liquid crystal display apparatus according to claim 2, wherein the non-liquid crystalline material comprises at least one polymer selected from the group consisting of polyimide, polyamide, polyester, polyetherketone, polyamideimide, and polyesterimide.
4. A liquid crystal display apparatus according to claim 1, wherein the optical compensation layer has a thickness of 1 to 20 μm.
5. A liquid crystal display apparatus according to claim 1, wherein the optical compensation element and the liquid crystal layer are arranged on the same side of the color filter.

* * * * *